(12) United States Patent
Kanda

(10) Patent No.: US 11,260,740 B2
(45) Date of Patent: Mar. 1, 2022

(54) VEHICLE POWER SUPPLY SYSTEM

(71) Applicant: Yazaki Corporation, Tokyo (JP)

(72) Inventor: Keisuke Kanda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/183,242

(22) Filed: Feb. 23, 2021

(65) Prior Publication Data
US 2021/0276407 A1 Sep. 9, 2021

(30) Foreign Application Priority Data
Mar. 3, 2020 (JP) .............................. JP2020-035434

(51) Int. Cl.
F02N 11/08 (2006.01)
B60K 6/42 (2007.10)

(52) U.S. Cl.
CPC ............ B60K 6/42 (2013.01); F02N 11/0818 (2013.01)

(58) Field of Classification Search
CPC ....... B60K 6/42; F02N 11/0818; F02N 11/04; F02N 11/0862; F02N 11/0814; F02N 2011/0888; F02N 2200/063; F02N 2250/02
See application file for complete search history.

(56) References Cited

U.S. PATENT DOCUMENTS
2007/0152641 A1 * 7/2007 Kusafuka .............. H02M 3/156 322/28

FOREIGN PATENT DOCUMENTS
EP 1 595 748 A1 11/2005
JP 2010-248964 A 11/2010

* cited by examiner

Primary Examiner — Xiao En Mo
(74) Attorney, Agent, or Firm — Kenealy Vaidya LLP

(57) ABSTRACT

The vehicle power supply system includes the DC/DC converter that is disposed on an electric path between the first load related to vehicle control and the battery and converts a voltage of direct current power supplied from the battery to the first load, and the detection device that detects the voltage of the battery. In a case where the engine is restarted by using the starter from the automatically stopped state of the engine, the detection device controls the DC/DC converter to start in a case where the voltage of the battery becomes equal to or less than a threshold value during a period from stoppage of the alternator to start of the starter.

4 Claims, 4 Drawing Sheets

VEHICLE POWER SUPPLY SYSTEM

CROSS-REFERENCE TO RELATED APPLICATION(S)

The present application claims priority to and incorporates by reference the entire contents of Japanese Patent Application No. 2020-035434 filed in Japan on Mar. 3, 2020.

BACKGROUND OF THE INVENTION

1. Field of the Invention

The present invention relates to a vehicle power supply system.

2. Description of the Related Art

In recent years, an idling stop system that automatically stops an engine when a vehicle is stopped and automatically starts the engine in response to a driver's operation intended to restart the vehicle is becoming widespread. A technique that combines such an idling stop system with another vehicle control has been proposed (see, for example, Japanese Patent Application Laid-open No. 2010-248964).

In a vehicle equipped with an idling stop system, a voltage of a battery temporarily drops when an engine is restarted by a starter. In view of this, in order to stabilize a voltage of electric power supplied from the battery to an electric load, for example, a DC/DC converter is disposed between the battery and the electric load and is operated as needed.

Conventionally, the operation of the DC/DC converter is started by a starter signal supplied from an ECU to the starter. This leaves a room for improvement in terms of simplification of the ECU.

SUMMARY OF THE INVENTION

The present invention was accomplished in view of the above problems, and an object of the present invention is to provide a vehicle power supply system that enables stable voltage supply to a necessary electric load even under a voltage drop resulting from restart of an engine without using a signal from an ECU in a vehicle having an idling stop system.

In order to achieve the above mentioned object, a vehicle power supply system according to one aspect of the present invention includes a battery mounted in a vehicle that uses an engine as a drive source; an alternator that generates electricity by driving of the engine and charges the battery; a starter motor that is driven by electric power supplied from the battery to start the engine in a stopped state where the alternator is not operating; a DC/DC converter that is disposed on an electric path between an electric load for vehicle control related to control of the vehicle and the battery and converts a voltage of direct current power supplied from the battery to the electric load for vehicle control; and a detection device that detects a voltage of the battery, wherein in a case where the engine is restarted by using the starter motor from an automatically stopped state where the engine is automatically stopped, the detection device controls the DC/DC converter to start in a case where the voltage of the battery becomes equal to or less than a threshold value during a period from stoppage of the engine to start of the starter motor.

According to another aspect of the present invention, in the vehicle power supply system, it is possible to configure that the threshold value is a voltage value that is lower than an output voltage of the operating alternator and is higher than a voltage of the fully-charged battery.

According to still another aspect of the present invention, in the vehicle power supply system, it is possible to configure that the detection device is disposed in the DC/DC converter.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a vehicle power supply system according to the present invention will be described in detail below with reference to the drawings. The present invention is not limited to the embodiment below. Constituent elements in the embodiment below include those that can be easily conceived by those skilled in the art or substantially identical constituent elements. Furthermore, the constituent elements in the embodiment below can be omitted, replaced, or changed in various ways without departing from the spirit of the invention.

EMBODIMENT

Figure 1:
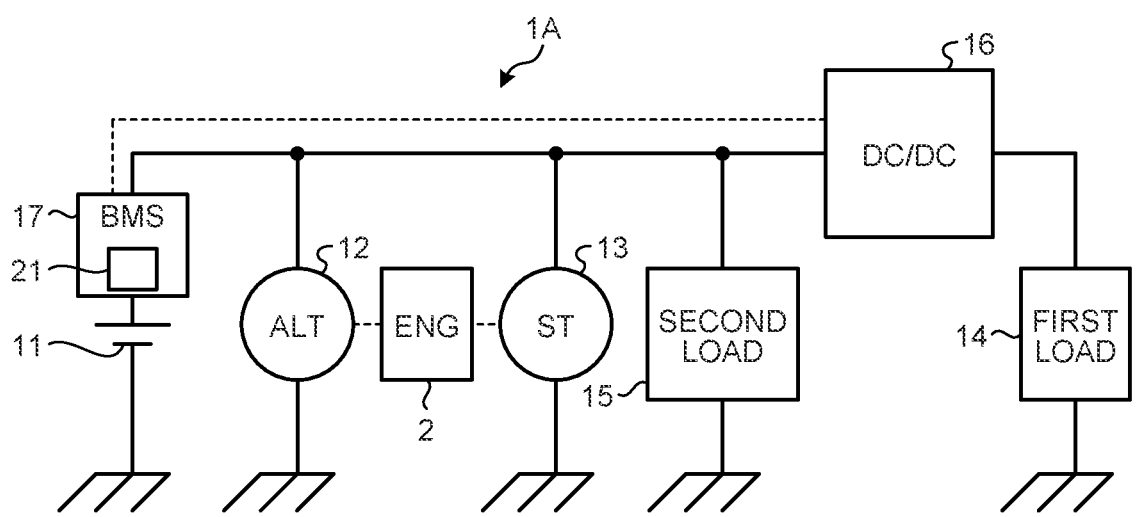
FIG. 1 is a schematic diagram illustrating an outline configuration of a vehicle power supply system according to an embodiment.
Figure 2:
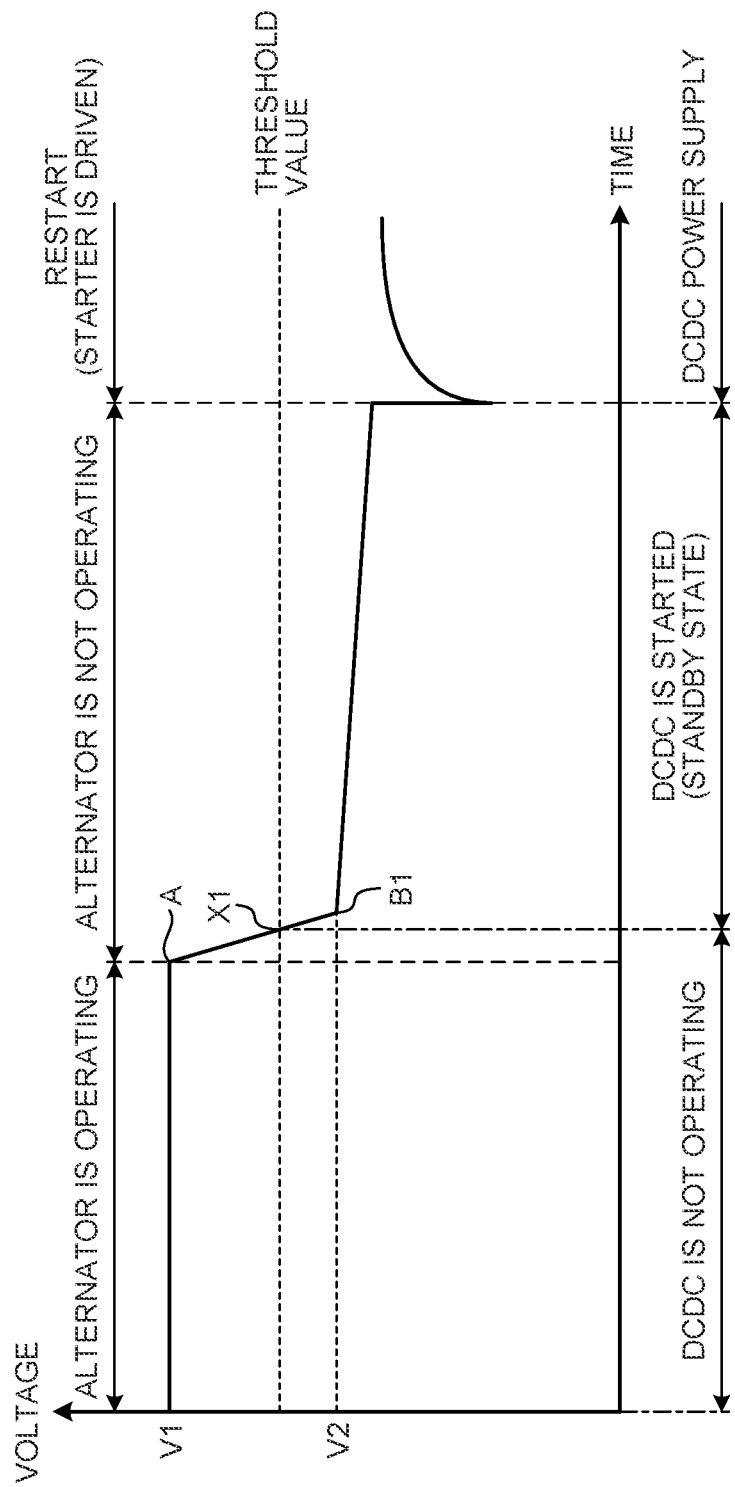
FIG. 2 is a diagram illustrating an example of a temporal change of a battery voltage during bulk charge in the vehicle power supply system according to the embodiment.
Figure 3:
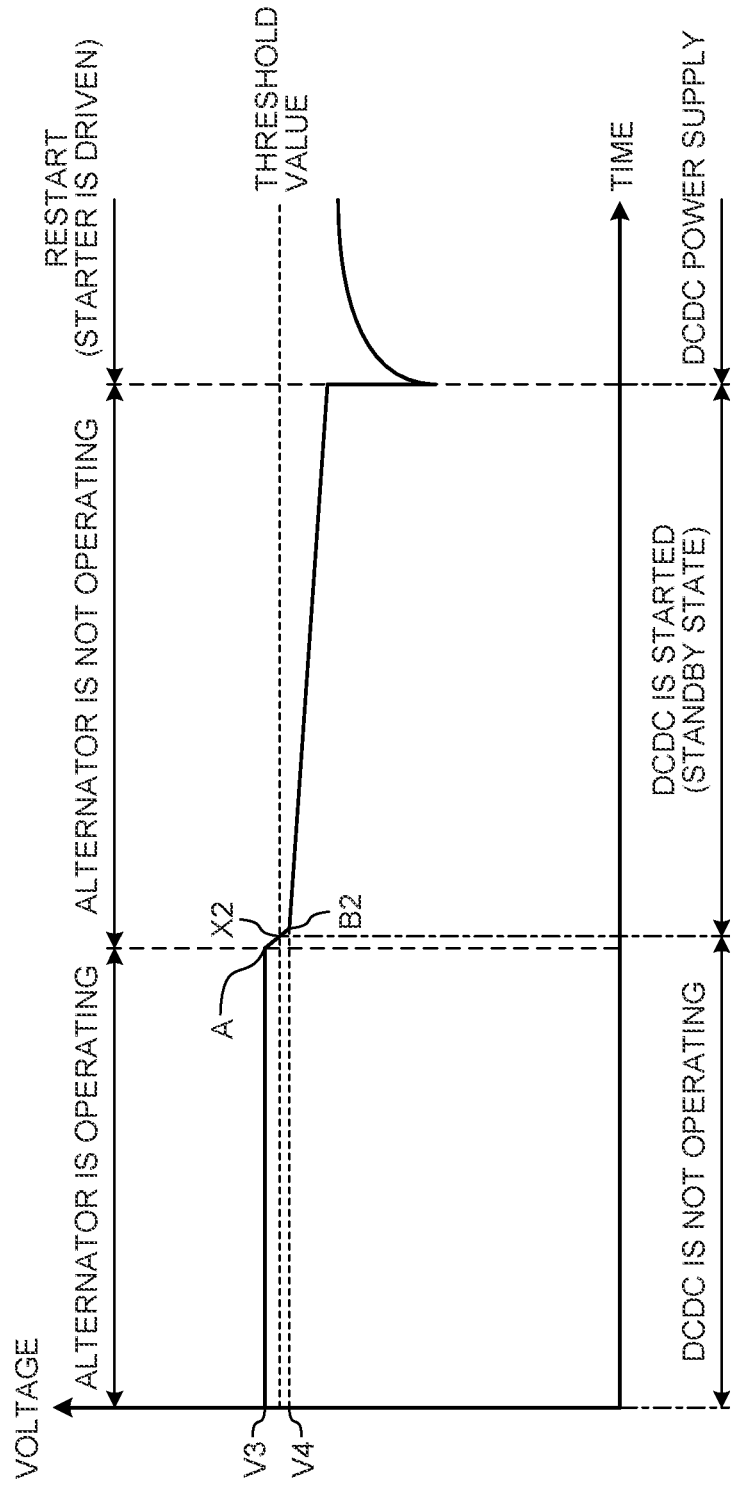
FIG. 3 is a diagram illustrating an example of a temporal change of a battery voltage during float charge in the vehicle power supply system according to the embodiment.

A vehicle power supply system according to the present embodiment will be described with reference to FIGS. 1 to 3. FIG. 1 is a schematic diagram illustrating an outline configuration of the vehicle power supply system according to the embodiment. FIG. 2 is a diagram illustrating an example of a temporal change of a battery voltage during bulk charge in the vehicle power supply system according to the embodiment. FIG. 3 is a diagram illustrating an example of a temporal change of a battery voltage during float charge in the vehicle power supply system according to the embodiment.

A vehicle power supply system 1A is mounted on a vehicle (not illustrated) that uses an engine (ENG) 2 as a drive source. The vehicle is equipped with an idling stop system. The idling stop system automatically stops the engine based on a predetermined stop condition and restarts the engine 2 by using a starter 13 based on a predetermined restart condition after the automatic stop. The engine 2 is, for example, a heat engine (internal combustion engine) that generates power by combusting a mixture of air and fuel in a combustion chamber. The engine 2 generates power for travelling of the vehicle and power for driving auxiliary machinery (not illustrated). The vehicle power supply system 1A includes a battery 11, an alternator (ALT) 12, the starter (ST) 13, a first load 14, a second load 15, a DC/DC converter (DC/DC) 16, and a battery management system (BMS) 17.

The battery 11 is a power source of the vehicle and is, for example, a secondary battery. The battery 11 is electrically connected to the alternator 12, the starter 13, the second load 15, and the DC/DC converter 16 via the battery management system 17 and a main relay (not illustrated). Further, the battery 11 is electrically connected to the first load 14 via the DC/DC converter 16. The battery 11 supplies direct current power to the starter 13 and the second load 15. Further, the battery 11 supplies direct current power to the first load via the DC/DC converter 16. It is assumed that only one battery 11 is provided for the vehicle.

The alternator 12 is a generator connected to the engine 2 mounted on the vehicle and converts mechanical power into alternating current power. The alternator 12 generates electricity by driving of the engine 2 and charges the battery 11. For example, the alternator 12 is connected to an output shaft of the engine 2 and is driven by a rotational force transmitted from the rotary shaft to generate electricity. Further, the alternator 12 is provided with a regulator (not illustrated), and a voltage and a current of the power generated by the alternator 12 are controlled by controlling operation of the regulator. The alternating current power generated by the alternator 12 is converted into direct current power by the regulator and is accumulated in the battery 11 and supplied to the second load 15. Further, the direct current power converted by the regulator can also be supplied to the first load 14 via the DC/DC converter 16. The alternator 12 may be directly connected to the output shaft of the engine 2 or may be indirectly connected to the output shaft of the engine 2 with, for example, a pulley and a belt interposed therebetween. Further, the alternator 12 may generate power (regenerative power) by using rotational energy of wheels during deceleration of the vehicle.

The starter 13 is a starter motor that assists start of the engine 2. The starter 13 converts the supplied electric power into rotational torque, and the rotational torque rotates a crankshaft (not illustrated) of the engine 2. The starter 13 is electrically connected to the battery 11 via a relay (not illustrated). The starter 13 is driven by electric power supplied from the battery 11 to start the engine 2 in a stopped state in which the alternator 12 is stopped.

The first load 14 is an example of an electric load for vehicle control related to control of the vehicle. The first load 14 needs to receive stable voltage supply from the battery 11 via the DC/DC converter 16 in the stopped state in which the alternator 12 is stopped. The first load 14 is, for example, an ECU (Electronic Control Unit) that controls the entire vehicle. Since the first load 14 is driven by a voltage lower than the voltage (for example, 12 V) of the battery 11, the first load 14 is connected to the battery 11 via the DC/DC converter 16, and the output voltage of the battery 11 boosted by the DC/DC converter 16 is supplied to the first load 14.

The second load 15 is an electric load mounted on the vehicle and is, for example, constituted by a head lamp, a room lamp, a tail/stop lamp, a wiper motor, and the like. The second load 15 is driven by electric power supplied from the alternator 12 in an operating state in which the alternator 12 is operating and is driven by electric power supplied from the battery 11 in the stopped state in which the alternator 12 is stopped.

The DC/DC converter 16 is disposed on an electric path between the first load 14 and the battery 11 and converts a voltage of the direct current power supplied from the battery 11 to the first load 14. The DC/DC converter 16 converts the output voltage of the battery 11 into a drive voltage (for example, 12 V) for driving the first load 14. The DC/DC converter 16 is, for example, an IC (Integrated Circuit) mounted on the ECU.

The battery management system 17 is connected to an anode side of the battery 11 and detects an input/output current of the battery 11. The battery management system 17 outputs the detected input current value or output current value to the ECU and the like. The battery management system 17 in the present embodiment includes a detection device 21 that detects the voltage of the battery 11.

In a case where the engine 2 is restarted by using the starter 13 from an automatically stopped state where the engine 2 is automatically stopped, the detection device 21 controls the DC/DC converter 16 to start (soft start) in a case where the voltage of the battery 11 becomes equal to or lower than a threshold value during a period from stoppage of the engine 2 and start of the starter 13. The detection device 21 is, for example, an IC mounted on the battery management system 17. The detection device 21 is, for example, electrically connected to the ECU and can determine, for example, whether the engine 2 has stopped or whether the engine 2 has started by receiving a signal regarding stoppage of the engine 2 or a signal regarding start of the engine 2 from the ECU.

The detection device 21 is electrically connected to the DC/DC converter 16 and can start the DC/DC converter 16 at a desired timing. In general, the DC/DC converter 16 needs to be started up slowly by control called soft start since rapid start-up can cause an overshoot or an inrush current and thereby stop the converter itself. Therefore, the detection device 21 detects the voltage of the battery 11, compares the detected voltage value with a threshold value, and soft-starts the DC/DC converter 16 when the voltage value becomes equal to or less than the threshold value. The threshold value in the present embodiment is a voltage value that is lower than an output voltage of the operating alternator 12 and is higher than the voltage of the fully charged battery 11.

Next, an example of operation of the vehicle power supply system 1A in a case where idling stop is performed will be described with reference to FIGS. 2 and 3. In the graphs illustrated in FIGS. 2 and 3, the vertical axis represents the input voltage of the DC/DC converter 16 (the voltage of the battery 11), and the horizontal axis represents time. FIG. 2 illustrates a change in the input voltage of the DC/DC converter 16 during bulk charge, and FIG. 3 illustrates a change in the input voltage of the DC/DC converter 16 during float charge. Bulk charge is a charge mode in which a current to the battery 11 is adjusted and a voltage is not adjusted. In this charge mode, for example, the battery 11 is charged to 75% to 80%. Float charge is a charge mode that adjusts the voltage. In this charge mode, a weak current is passed through the battery 11 to maintain a fully charged state.

In the bulk charge method illustrated in FIG. 2, the input voltage of the DC/DC converter 16 is not adjusted and is therefore the same as the output voltage of the alternator 12 while the alternator 12 is operating. Furthermore, the DC/DC converter 16 is not operating while the alternator 12 is operating.

Next, when idling stop is performed at a time A in FIG. 2, the engine 2 is stopped and operation of the alternator 12 is stopped. Immediately after that, the input voltage starts to drop, and the input voltage drops from V1 to V2 (B1). The input voltage V2 is approximately the output voltage of the battery 11. When the input voltage drops from V1 to V2, the input voltage crosses a preset threshold value (X1), and therefore the detection device 21 determines that the voltage of the battery 11 has become equal to or less than the threshold value and sends a signal to start the DC/DC converter 16. This starts the DC/DC converter 16.

As a result of start of the starter 13, the input voltage of the DC/DC converter 16 drops temporarily, but power supply to the battery 11 is started by operation of the alternator 12. Even after start of operation of the alternator 12, the DC/DC converter 16 operates for a certain period of time until an appropriate voltage is output. This prevents operation of the DC/DC converter 16 from becoming unstable, thereby preventing the output voltage from dropping. Further, this enables stable power supply to the first load 14, thereby preventing a system that controls the vehicle from stopping operation.

In the float charge illustrated in FIG. 3, the input voltage of the DC/DC converter 16 is adjusted to have a constant voltage while the alternator 12 is operating. Furthermore, the DC/DC converter 16 is not operating while the alternator 12 is operating.

Next, when idling stop is performed at a time A in FIG. 2, the engine 2 is stopped and operation of the alternator 12 is stopped. Immediately after that, the input voltage starts to drop, and the input voltage drops from V3 to V4 (B2). The input voltage V4 is approximately the output voltage of the battery 11. When the input voltage drops from V3 to V4, the input voltage crosses a preset threshold value (X2), and therefore the detection device 21 determines that the voltage of the battery 11 has become equal to or less than the threshold value and sends a signal to start the DC/DC converter 16. This starts the DC/DC converter 16.

As a result of start of the starter 13, the input voltage of the DC/DC converter 16 drops temporarily, but power supply to the battery 11 is started by operation of the alternator 12. Even after start of operation of the alternator 12, the DC/DC converter 16 operates for a certain period of time until an appropriate voltage is output. This prevents operation of the DC/DC converter 16 from becoming unstable, thereby preventing the output voltage from dropping. Further, this enables stable power supply to the first load 14, thereby preventing a system that controls the vehicle from stopping operation.

The vehicle power supply system 1A according to the first embodiment described above includes the DC/DC converter 16 that is disposed on an electric path between the first load 14 related to vehicle control and the battery 11 and converts a voltage of direct current power supplied from the battery 11 to the first load 14, and the detection device 21 that detects the voltage of the battery 11. In a case where the engine 2 is restarted by using the starter 13 from the automatically stopped state of the engine 2, the detection device 21 controls the DC/DC converter 16 to start in a case where the voltage of the battery 11 becomes equal to or less than a threshold value during a period from stoppage of the alternator 12 to start of the starter 13.

The above configuration enables stable voltage supply to a necessary electric load even under a voltage drop resulting from restart of the engine 2 in the vehicle having an idling stop system. Although conventionally, the ECU on the vehicle side controls start of the DC/DC converter 16 upon receipt of a start signal of the starter 13, the above configuration enables control on the vehicle power supply system 1A side, thereby enabling stable voltage supply to an important electrical load (the first load 14) without using a signal from the ECU. Further, start of the DC/DC converter 16 enables stable voltage supply to the important electric load even if a momentary voltage drop occurs due to cranking at the start of the starter 13.

Further, in the vehicle power supply system 1A according to the present embodiment, the threshold value is lower than the output voltage of the operating alternator 12 and is higher than the voltage of the fully charged battery 11. The threshold is set to a voltage lower than the maximum output voltage of the alternator 12 so that the detection device 21 does not start the DC/DC converter 16 during operation of the alternator 12. As a result, the detection device 21 can start the DC/DC converter 16 at an appropriate timing. Specifically, although an amount of voltage drop after stoppage of the alternator 12 changes depending on a state of charge of the battery 11, the voltage of the battery 11 gradually drops due to the presence of the second load 15 that operates even while the alternator 12 is not operating. Therefore, even if the voltage drop of the battery 11 cannot be detected immediately after stoppage of the alternator 12, the DC/DC converter 16 can be started before the engine 2 is restarted.

Although the battery management system 17 has the detection device 21 in the above embodiment, this is not restrictive. For example, the DC/DC converter 16 may have the detection device 21 instead of the battery management system 17.

Figure 4:
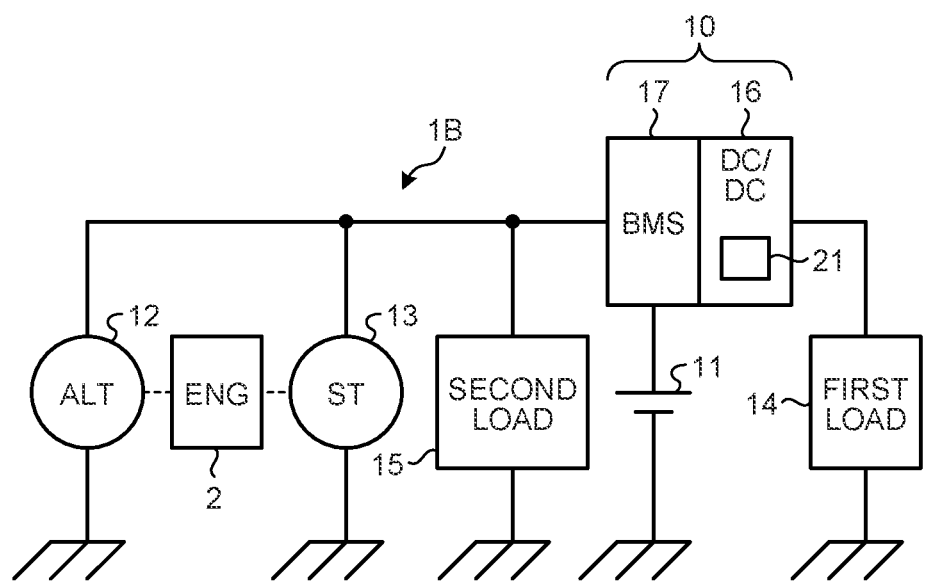
FIG. 4 is a schematic diagram illustrating an outline configuration of a vehicle power supply system according to a modification of the embodiment.

Modification Next, a vehicle power supply system according to a modification of the embodiment will be described with reference to FIG. 4. FIG. 4 is a schematic diagram illustrating an outline configuration of the vehicle power supply system according to the modification of the embodiment. A vehicle power supply system 1B according to the modification of the embodiment is different from the vehicle power supply system 1A in that a DC/DC converter 16 and a battery management system 17 are integrated with each other, as illustrated in FIG. 4. In the following description, repeated description about configuration, action, and effect identical to those of the above embodiment will be omitted as much as possible.

The vehicle power supply system 1B according to the modification of the embodiment includes a battery 11, an alternator 12, a starter 13, a first load 14, a second load 15, and a converter unit 10.

The converter unit 10 is constituted by a DC/DC converter 16 and a battery management system 17. The DC/DC converter 16 in this embodiment includes a detection device 21.

The vehicle power supply system 1B according to the above modification has a converter unit in which the DC/DC converter 16 and the battery management system 17 are integrated with each other. With the configuration, necessary current and voltage detection functions can be shared by the battery management system 17 and the DC/DC converter 16. This allows a reduction in size and a reduction in cost.

According to the vehicle power supply system according to the present embodiment, it is possible to produce an effect of enabling stable voltage supply to a necessary electric load even under a voltage drop resulting from restart of an engine without using a signal from an ECU in a vehicle having an idling stop system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply system comprising:
   a battery mounted in a vehicle that uses an engine as a drive source;
   an alternator that generates electricity by driving of the engine and charges the battery;
   a starter motor that is driven by electric power supplied from the battery to start the engine in a stopped state where the alternator is not operating;
   a DC/DC converter that is disposed on an electric path between an electric load for vehicle control related to control of the vehicle and the battery and converts a voltage of direct current power supplied from the battery to the electric load for vehicle control; and
   a detection device that detects a voltage of the battery, wherein
   in a case where the engine is restarted by using the starter motor from an automatically stopped state where the engine is automatically stopped, the detection device controls the DC/DC converter to start in a case where the voltage of the battery becomes equal to or less than a threshold value during a period from stoppage of the engine to start of the starter motor.

2. The vehicle power supply system according to claim 1, wherein
   the threshold value is a voltage value that is lower than an output voltage of the operating alternator and is higher than a voltage of the fully-charged battery.

3. The vehicle power supply system according to claim 1, wherein
   the detection device is disposed in the DC/DC converter.

4. The vehicle power supply system according to claim 2, wherein
   the detection device is disposed in the DC/DC converter.

* * * * *